(12) United States Patent
Yoon

(10) Patent No.: US 11,162,564 B2
(45) Date of Patent: Nov. 2, 2021

(54) PENDULUM-TYPE ACCESSARY TENSIONER

(71) Applicants: Hyundai Motor Company, Seoul (KR); Kia Motors Corporation, Seoul (KR)

(72) Inventor: Ki-Bong Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 315 days.

(21) Appl. No.: 16/406,742

(22) Filed: May 8, 2019

(65) Prior Publication Data

US 2020/0088273 A1 Mar. 19, 2020

(30) Foreign Application Priority Data

Sep. 18, 2018 (KR) .................. 10-2018-0111746

(51) Int. Cl.
*F16H 7/12* (2006.01)
*F02B 67/06* (2006.01)
*F16H 7/08* (2006.01)

(52) U.S. Cl.
CPC .......... *F16H 7/1281* (2013.01); *F02B 67/06* (2013.01); *F16H 2007/0806* (2013.01); *F16H 2007/0865* (2013.01); *F16H 2007/0893* (2013.01)

(58) Field of Classification Search
CPC .......... F16H 7/1281; F16H 2007/0806; F16H 2007/0874; F16H 2007/0893; F02B 67/06
USPC ......................................... 474/134
See application file for complete search history.

(56) References Cited

U.S. PATENT DOCUMENTS

| | | | | |
|---|---|---|---|---|
| 1,557,486 | A * | 10/1925 | Valentine | F16H 7/1281 474/135 |
| 4,940,447 | A * | 7/1990 | Kawashima | F16F 13/00 474/110 |
| 6,648,783 | B1 * | 11/2003 | Bogner | F16H 7/1281 474/134 |
| 6,689,001 | B2 * | 2/2004 | Oliver | F16H 7/1281 474/134 |
| 7,163,478 | B2 * | 1/2007 | Oliver | F16H 7/1281 474/133 |
| 8,968,128 | B2 * | 3/2015 | Wolf | F16H 7/1281 474/135 |
| 9,103,411 | B2 * | 8/2015 | Wolf | F02B 67/06 |
| 9,182,015 | B2 * | 11/2015 | Mack | F02B 67/06 |
| 9,416,853 | B2 * | 8/2016 | Wolf | F02B 67/06 |
| 9,599,199 | B2 * | 3/2017 | Graves | F02B 67/06 |
| 9,625,013 | B2 * | 4/2017 | Wolf | F16H 7/1281 |
| 9,709,137 | B2 * | 7/2017 | Walter | F16H 7/0831 |
| 9,759,293 | B2 * | 9/2017 | Ryeland | F16H 7/1281 |
| 10,520,066 | B2 * | 12/2019 | Walter | F16H 7/1218 |

(Continued)

FOREIGN PATENT DOCUMENTS

| | | |
|---|---|---|
| JP | H08240244 A | 9/1996 |
| JP | 2000018346 A | 1/2000 |
| KR | 101637752 B1 | 7/2016 |

*Primary Examiner* — Henry Y Liu

(74) *Attorney, Agent, or Firm* — Mintz, Levin, Cohn, Ferris, Glovsky, and Popeo, P.C.; Peter F. Corless

(57) ABSTRACT

A pendulum-type accessory tensioner includes an elastic unit having a main spring and a sub-spring with different rigidities, in which tension of an accessory belt is kept constant even when different angular velocity variations are applied to the tensioner.

17 Claims, 7 Drawing Sheets

(56) References Cited

U.S. PATENT DOCUMENTS

| | | | |
|---|---|---|---|
| 10,704,656 B2* | 7/2020 | Maricic | F16H 7/1281 |
| 2003/0216203 A1* | 11/2003 | Oliver | F16H 7/1281 |
| | | | 474/134 |
| 2013/0040770 A1* | 2/2013 | Wolf | F16H 7/1281 |
| | | | 474/134 |
| 2013/0095967 A1* | 4/2013 | Wolf | F16H 7/1281 |
| | | | 474/135 |
| 2013/0203535 A1* | 8/2013 | Mack | F16H 7/129 |
| | | | 474/134 |
| 2014/0256488 A1* | 9/2014 | Wolf | F16H 7/12 |
| | | | 474/135 |
| 2015/0308545 A1* | 10/2015 | Harvey | F02B 67/06 |
| | | | 474/117 |
| 2016/0138699 A1* | 5/2016 | Dell | F16F 15/12346 |
| | | | 474/94 |
| 2016/0146312 A1* | 5/2016 | Pfeifer | F16H 7/08 |
| | | | 474/135 |
| 2017/0074375 A1* | 3/2017 | Ryeland | F16H 7/1281 |
| 2017/0306836 A1* | 10/2017 | Replete | F02B 67/06 |
| 2018/0017143 A1* | 1/2018 | Antchak | B60K 25/02 |
| 2019/0285148 A1* | 9/2019 | Ma | F16H 7/20 |

\* cited by examiner

PENDULUM-TYPE ACCESSARY TENSIONER

CROSS-REFERENCE TO RELATED APPLICATION

This application claims under 35 U.S.C. § 119(a) the benefit of Korean Patent Application No. 10-2018-0111746, filed on Sep. 18, 2018, the entire contents of which are incorporated herein by reference.

BACKGROUND

(a) Technical Field

The present disclosure relates to a pendulum-type accessory tensioner, more particularly, to the pendulum-type accessory tensioner with a double arm that is capable of preventing impact, noise, and instability of an accessory belt when an angular velocity of the pendulum-type accessory tensioner is rapidly changed.

(b) Description of Related Art

Generally, in a 48V mild hybrid system, power of a mild hybrid starter and generator (hereinafter, referred to as an "MHSG") is transmitted by an accessory belt, and torque transmission directions vary during cranking/boost and regenerative braking of the MHSG. Therefore, there is a need for a pendulum-type accessory tensioner.

In general, a power transmission system of the MHSG in the 48V mild hybrid system includes a pendulum-type accessory tensioner that has a shaft driving wheel 2 disposed on a drive shaft of the MHSG, driving pulleys 4 and 6 that are respectively disposed on a crankshaft and an air conditioner compressor, and an accessory belt 8 that is wound around the shaft driving wheel 2 and the driving pulleys 4 and 6 disposed on the respective crankshaft and air conditioner compressor.

FIG. 1 (RELATED ART) is an exploded perspective view illustrating a general pendulum-type accessory tensioner.

The general pendulum-type accessory tensioner includes first and second tensioning pulleys 10 and 12 that apply tension to an accessory belt 8 in the direction of rotation of the shift driving wheel 2 in the respective front and rear of the shaft driving wheel 2, a tensioning arm 18 that is mounted with the first tensioning pulley 10, an arc spring 14 for generating tension, a tensioning housing 16 that movably mounts the tensioning arm 18 applied by the force of the spring 14, and a support part 32 that is integrally formed in the tensioning housing 16 at a position symmetrical to the tensioning arm 18, wherein the second tensioning pulley 12 is mounted to the support part 32 and the support part 32 supports one end of the tensioning arm 18.

The tensioning housing 16 is pivotally mounted about the axis of a drive shaft, and has an arc-shaped channel therein to accommodate the movably mounted tensioning arm 18 and the arc spring 14 in the arc-shaped channel.

In the general pendulum-type accessory tensioner having the above configuration, torque transmission directions vary during the cranking/boost and regenerative braking of an MHSG as illustrated in FIGS. 3 and 4 (RELATED ART). Hence, when an angular velocity variation is large as in start-up, impact and noise occur as illustrated in FIG. 5 (RELATED ART) due to the relative movement between the tensioner and the accessory belt 8 according to the characteristic curve of the tensioner illustrated in FIG. 2 (RELATED ART), which may lead to the instability of the accessory belt system.

SUMMARY

An embodiment of the present disclosure is configured to prevent impact, noise, etc. due to relative movement between a pendulum-type accessory tensioner and an accessory belt when an angular velocity of the tensioner is rapidly changed.

Other objects and advantages of the present disclosure can be understood by the following description, and become apparent with reference to the embodiments of the present disclosure. Also, it is apparent to those skilled in the art to which the present disclosure pertains that the objects and advantages of the present disclosure can be realized by the apparatus/device/system as described herein and combinations thereof.

In accordance with an embodiment of the present disclosure, a pendulum-type accessory tensioner includes an elastic unit including a main spring and a sub-spring having different rigidities, wherein tension of an accessory belt is kept constant even when different angular velocity variations are applied to the tensioner.

The main spring and the sub-spring may have different lengths.

A shorter one of the main spring and the sub-spring may have a greater rigidity than the other one of the main spring and sub-spring.

The elastic unit may press a tensioning arm, an upper portion of which is mounted with a tensioning pulley.

The tensioning arm may be movably mounted in a tensioning housing.

The tensioning arm may have an arc-shaped extension part formed to extend by a certain length toward a support formed at a position symmetrical to a head part of the tensioning arm in the tensioning housing.

The extension part may include a first extension part extending from the head part of the tensioning arm by a certain length, a second extension part extending from the first extension part by a certain length and having a smaller diameter than the first extension part, and a third extension part extending from the second extension part by a certain length and having a smaller diameter than the second extension part.

The third extension part may be inserted into a shorter one of the main spring and the sub-spring.

The second extension part may be inserted into a longer one of the main spring and the sub-spring.

A shorter one of the main spring and the sub-spring may be inserted into the other one of the main spring and the sub-spring.

The diameter of the second extension part may be larger than that of a shorter one of the main spring and the sub-spring.

One end of the shorter one of the main spring and the sub-spring may be seated on the other end surface of the second extension part.

The diameter of the first extension part may be larger than that of a longer one of the main spring and the sub-spring.

One end of the longer one of the main spring and the sub-spring may be seated on the other end surface of the first extension part.

The third extension part may be a shorter length than when a shorter one of the main spring and the sub-spring is fully compressed.

A combined length of the second and third extension parts may be shorter than that when a longer one of the main spring and the sub-spring is fully compressed.

A more rigid one of the main spring and the sub-spring may not operate in an operating range of the other one of the main spring and the sub-spring.

The other end of the elastic unit may be seated on a tensioning arm fixed in a tensioning housing.

The elastic unit may be an arc spring.

The tensioning housing may have an arc-shaped channel therein to accommodate the elastic unit and the extension part of the tensioning arm.

The tensioning housing may be pivotally mounted about an axis of a drive shaft.

The tensioning pulley may apply tension to the accessory belt in a direction of rotation of a shift driving wheel in the front and rear of the shaft driving wheel.

The accessory belt may be wound around the shaft driving wheel, a driving pulley disposed on a crankshaft, and a driving pulley disposed on an air conditioner compressor.

DESCRIPTION OF SPECIFIC EMBODIMENTS

Figure 1:
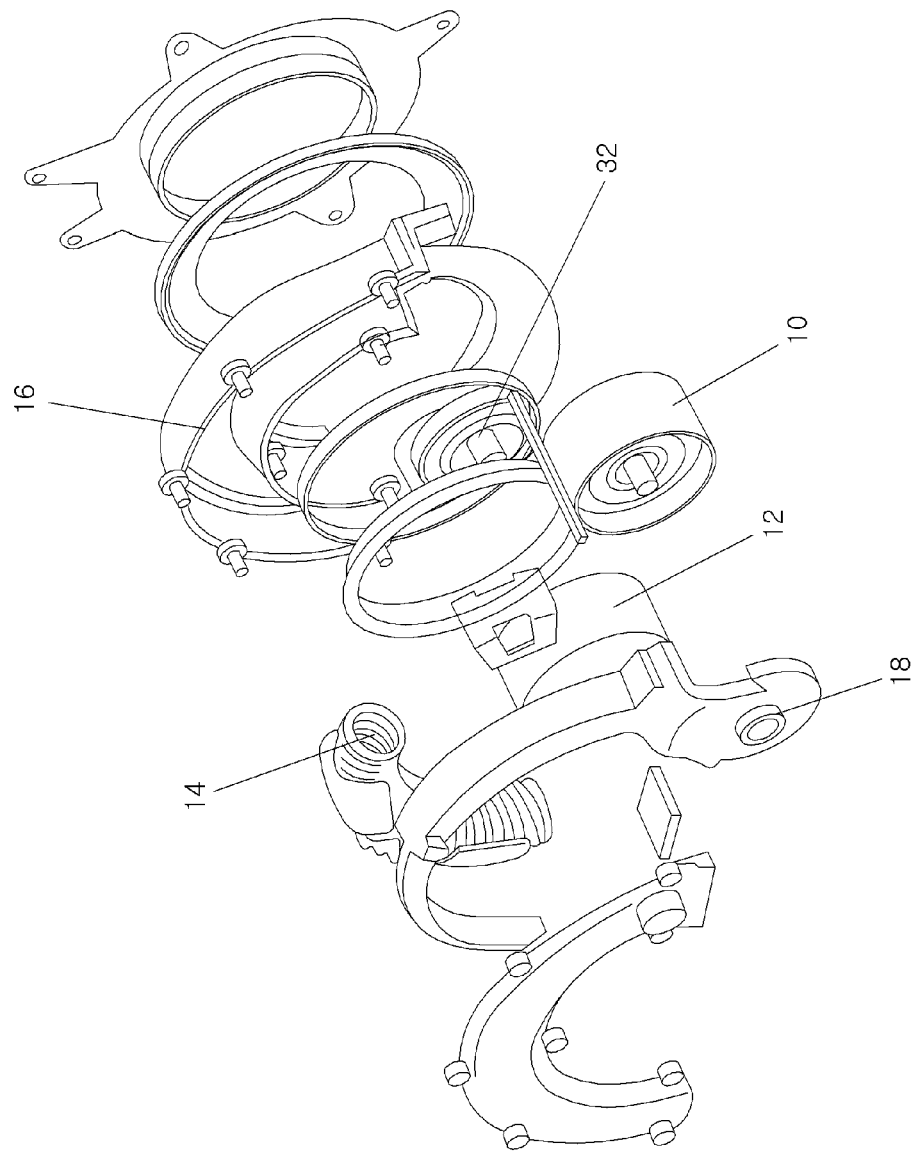
FIG. 1 (RELATED ART) is an exploded perspective view illustrating a general pendulum-type accessory tensioner.
Figure 2:
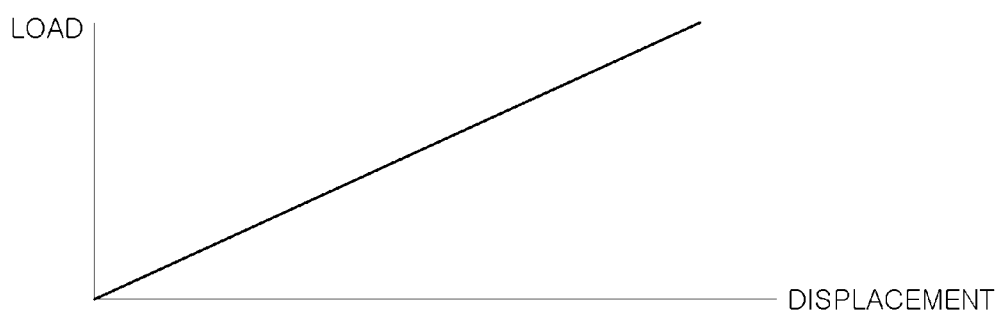
FIG. 2 (RELATED ART) illustrates a characteristic curve of the tensioner illustrated in FIG. 1.
Figure 3:
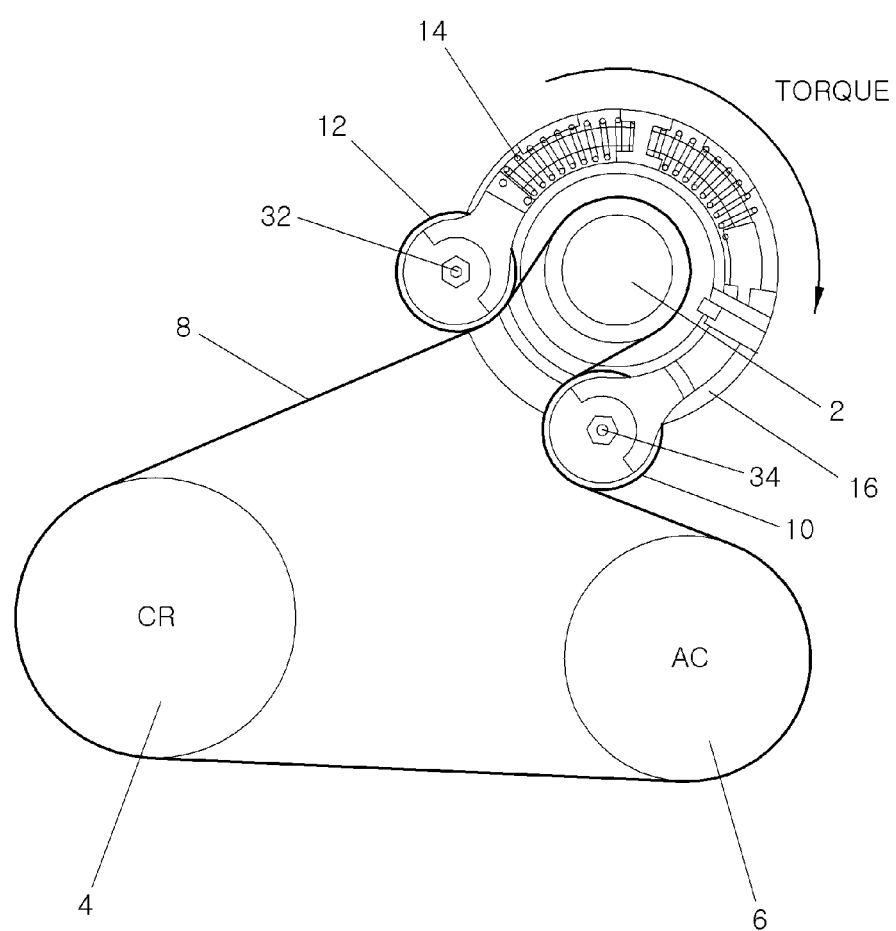
FIG. 3 (RELATED ART) is a conceptual view illustrating a torque transmission direction of the general pendulum-type accessory tensioner in a cranking/boost area.
Figure 4:
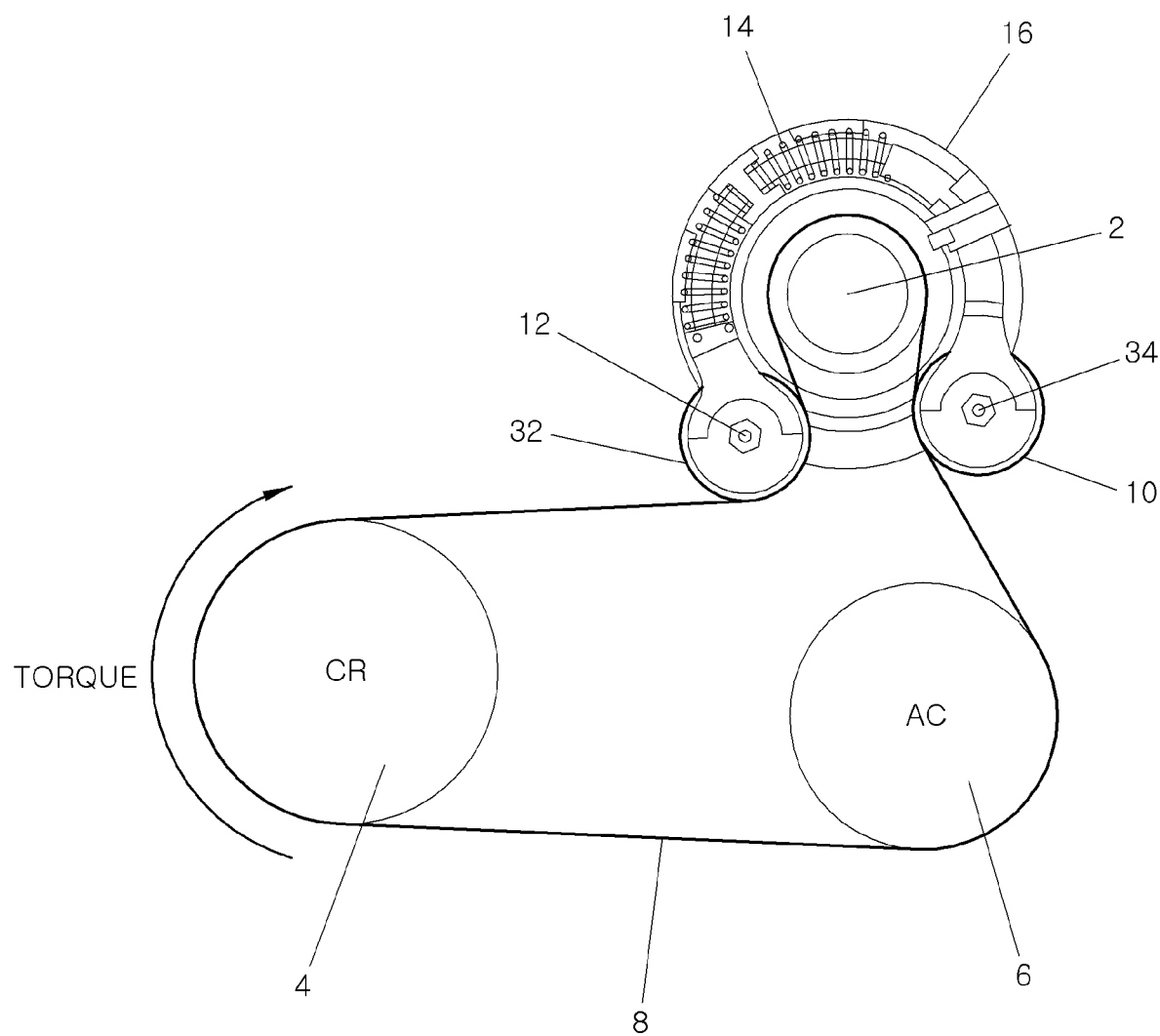
FIG. 4 (RELATED ART) is a conceptual view illustrating a torque transmission direction of the general pendulum-type accessory tensioner in a regenerative braking area.
Figure 5:
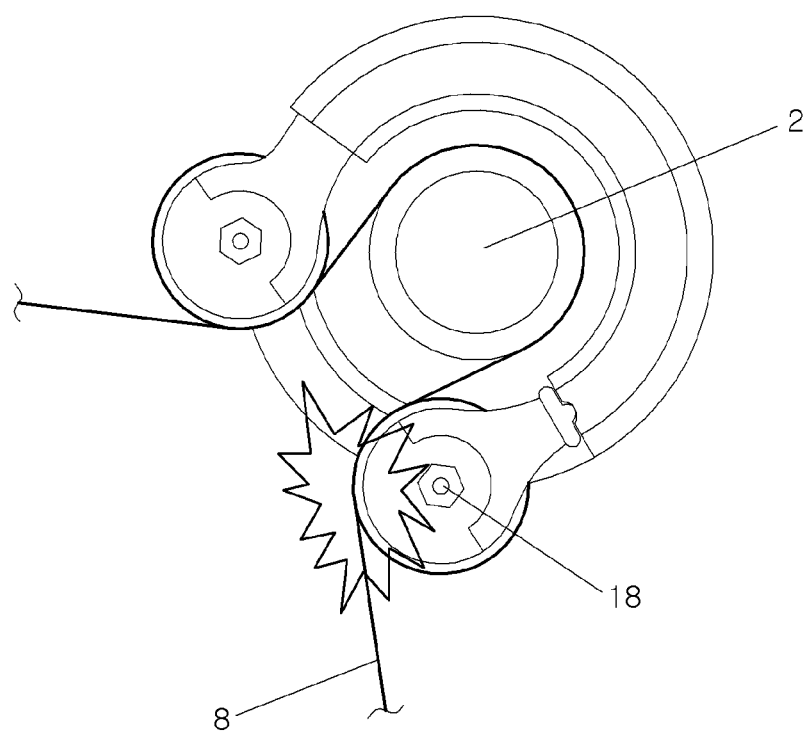
FIG. 5 (RELATED ART) is a conceptual view illustrating impact caused when the angular velocity of the general pendulum-type accessory tensioner is rapidly changed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The drawings are not necessarily to scale and in some instances, proportions may have been exaggerated in order to clearly illustrate features of the embodiments. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art.

An embodiment of the present disclosure relates to a pendulum-type accessory tensioner; and, particularly, to a pendulum-type accessory tensioner capable of preventing impact, noise, and instability of an accessory belt when the angular velocity of the pendulum-type accessory tensioner with a double arm is rapidly changed.

A power transmission system of a mild hybrid starter and generator (MHSG) including the tensioner according to the embodiment of the present disclosure includes a shaft driving wheel 2 that is disposed on a drive shaft of the MHSG, driving pulleys 4 and 6 that are respectively disposed on a crankshaft and an air conditioner compressor, and an accessory belt 8 that is wound around the shaft driving wheel 2 and the driving pulleys 4 and 6 disposed on the respective crankshaft and air conditioner compressor.

Figure 6:
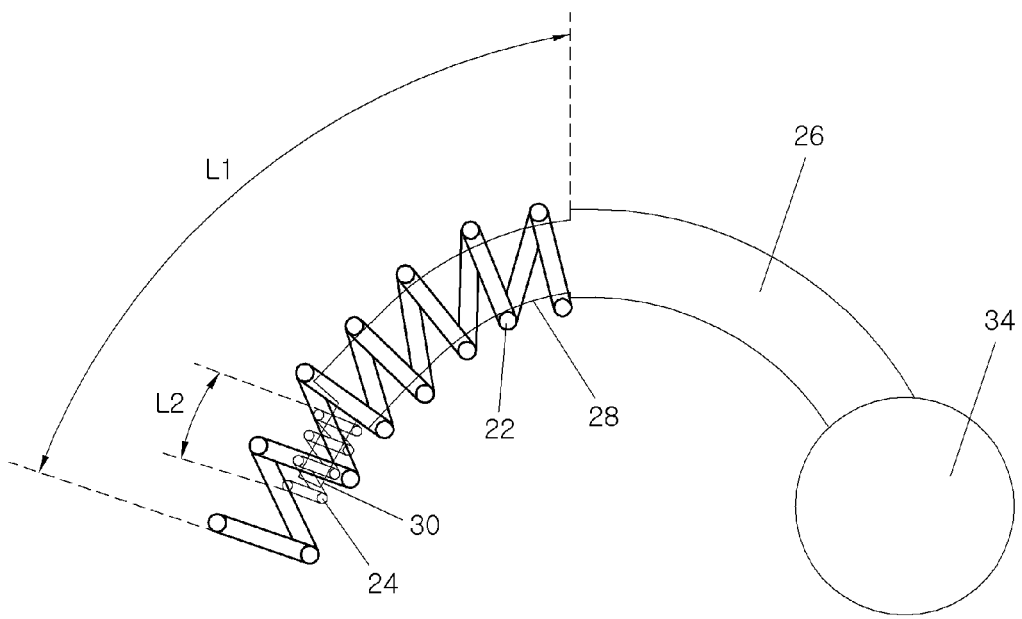
FIG. 6 is a conceptual view illustrating a tensioning arm and elastic units included in a pendulum-type accessory tensioner according to an embodiment of the present disclosure.

FIG. 6 is a conceptual view illustrating a tensioning arm and elastic units included in the pendulum-type accessory tensioner according to the embodiment of the present disclosure.

The tensioner includes two tensioning pulleys 10 and 12 that apply tension to the accessory belt 8 in the direction of rotation of the shift driving wheel 2 in the respective front and rear of the shaft driving wheel 2, a tensioning arm 20, the upper portion of which is mounted with one 10 of the tensioning pulleys, and a plurality of elastic units 22 and 24 for generating tension to press the tensioning arm 20.

The elastic units 22 and 24 are arc springs having different rigidities, and consist of two springs, namely a main spring 22 and a sub-spring 24 in the embodiment of the present disclosure.

The main spring 22 and the sub-spring 24 preferably have different lengths, and a shorter one of the main spring 22 and the sub-spring 24 has a greater rigidity than the other one of the main spring 22 and the sub-spring 24.

In the embodiment of the present disclosure, the main spring 22 will be assumed and described as being longer than the sub-spring 24.

A tensioning housing 16 is pivotally mounted about the axis of the drive shaft. The tensioning arm 20 is movably mounted in the tensioning housing 16. A support part 32 is integrally formed at a position symmetrical to a head part 34 of the tensioning arm 20 in the tensioning housing 16. The other tensioning pulley 12 is mounted to the upper portion of the support part 32 that supports the load of the tensioning arm 20.

The tensioning arm 20, which is mounted in the tensioning housing 16 to be movable along with movement of the tensioning housing 16, has an arc-shaped extension part formed to extend toward the support part 32 by a certain length.

The tensioning housing 16 has an arc-shaped channel therein to accommodate the elastic units 22 and 24 and the extension part of the tensioning arm 20.

The extension part includes a first extension part 26 that extends from the head part 34 of the tensioning arm 20 by a certain length, a second extension part 28 that extends from the first extension part 26 by a certain length and has a smaller diameter than the first extension part 26, and a third extension part 30 that extends from the second extension part 28 by a certain length and has a smaller diameter than the second extension part 28.

The diameter of the first extension part 26 is larger than that of the longer one (i.e., the main spring 22) of the main spring 22 and the sub-spring 24, and the diameter of the second extension part 28 is larger than that of the shorter one (i.e., the sub-spring 24) of the main spring 22 and the sub-spring 24.

The second extension part 28 is inserted into the longer one (i.e., the main spring 22) of the main spring 22 and the sub-spring 24. One end of the main spring 22, into which the second extension part 28 is inserted, is seated on the other end surface of the first extension part 26 from which the second extension part 28 extends, and the other end of the main spring 22 is seated on the support part 32.

The length of the main spring 22 should be longer than the combined length of the second and third extension parts 28 and 30 when the main spring 22 is fully compressed.

That is, when the main spring 22 is fully compressed by the movement of the tensioning arm 20 according to the rotation of the tensioning housing 16, the other end of the third extension part 30 should not be in contact with the support part 32.

The third extension part 30 is inserted into the shorter one (i.e., the sub-spring 24) of the main spring 22 and the sub-spring 24. One end of the sub-spring 24, into which the third extension part 30 is inserted, is seated on the other end surface of the second extension part 28 from which the third extension part 30 extends, and the other end of the sub-spring 24 is seated on the support part 32.

The length of the sub-spring 24 should be longer than that of the third extension part 30 when the sub-spring 24 is fully compressed. That is, when the sub-spring 24 is fully compressed by the movement of the tensioning arm 20 according to the rotation of the tensioning housing 16, the other end of the third extension part 30 should not be in contact with the support part 32.

When the third extension part 30 is inserted into the sub-spring 24 and the second extension part 28 is inserted into the main spring 22, the sub-spring 24 is inserted into the main spring 22 so as to be coaxial with the main spring 22, in which case the gap between the main spring 22 and the sub-spring 24 is formed such that one of the main spring 22 and the sub-spring 24 does not interfere with the other when operating.

The main spring 22 and the sub-spring 24 are provided to have different rigidities in consideration of different angular velocity variations applied to the tensioner, and the more rigid sub-spring 24 does not operate in the operating range of the less rigid main spring 22.

Figure 7:
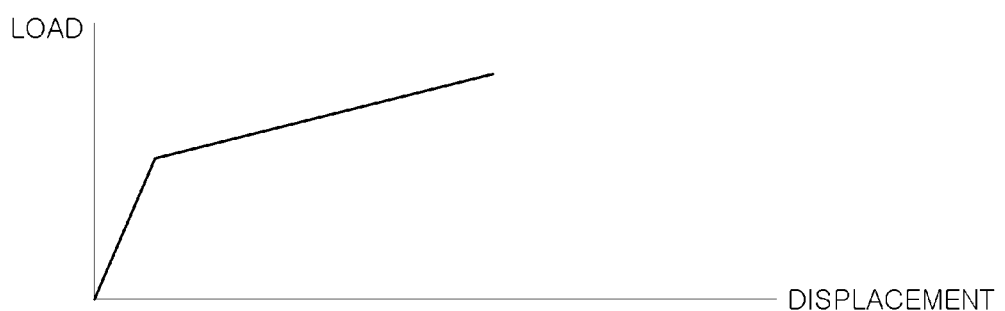
FIG. 7 illustrates a characteristic curve of the pendulum-type accessory tensioner including the tensioning arm and the elastic units according to the embodiment of the present disclosure.

FIG. 7 illustrates a characteristic curve of the pendulum-type accessory tensioner including the tensioning arm and the elastic units according to the embodiment of the present disclosure.

The tensioner has a characteristic curve as illustrated in FIG. 7 by the elastic units 22 and 24 having different rigidities, so that the tension of the accessory belt 8 is kept constant even though different angular velocity variations are applied to the tensioner.

That is, when a certain amount or less of angular velocity variation is applied to the tensioner, the main spring 22 acts to maintain the tension of the accessory belt 8, whereas when a certain amount or more of angular velocity variation is applied to the tensioner, the sub-spring 24 acts to maintain the tension of the accessory belt 8.

It is possible to prevent impact, noise, etc. due to the relative movement between the tensioner and the accessory belt 8 according to which the tension of the accessory belt 8 is kept constant.

The elastic units may include an additional spring besides the above-mentioned main spring 22 and sub-spring 24. In this case, since all of the springs have different rigidities, the tension of the accessory belt 8 can be kept constant even at various angular velocity variations applied to the tensioner according to the number of springs constituting the elastic units.

The extension part may include an Nth extension part according to a change in the number of elastic units.

In accordance with exemplary embodiments of the present disclosure, since the plurality of elastic units having different rigidities are mounted to the movably mounted tensioning arm of the components of the pendulum-type accessory tensioner so that the tensioner has a two-stage characteristic curve, it is possible to maintain the tension of the accessory belt and thus to prevent impact, noise, etc. due to the relative movement between the tensioner and the accessory belt.

While the present disclosure has been described with respect to the embodiments of the pendulum-type accessory tensioner illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims. In addition, it should be understood that the present disclosure includes all modifications, equivalents or replacements that fall within the spirit and scope of the present disclosure as defined in the appended claims.

What is claimed is:

1. A pendulum-type accessory tensioner comprising:
an elastic unit comprising a main spring and a sub-spring having different rigidities,
wherein tension of an accessory belt is kept constant even when different angular velocity variations are applied to the tensioner,
wherein the elastic unit presses a tensioning arm, an upper portion of which is mounted with a tensioning pulley,
wherein the tensioning arm is movably mounted in a tensioning housing, and
wherein the tensioning arm has an arc-shaped extension part formed to extend by a certain length toward a support formed at a position symmetrical to a head part of the tensioning arm in the tensioning housing.

2. The pendulum-type accessory tensioner of claim 1, wherein the main spring and the sub-spring have different lengths.

3. The pendulum-type accessory tensioner of claim 2, wherein a shorter one of the main spring and the sub-spring has a greater rigidity than the other one of the main spring and the sub-spring.

4. The pendulum-type accessory tensioner of claim 1, wherein the extension part comprises:
a first extension part extending from the head part of the tensioning arm by a certain length;
a second extension part extending from the first extension part by a certain length and having a smaller diameter than the first extension part; and
a third extension part extending from the second extension part by a certain length and having a smaller diameter than the second extension part.

5. The pendulum-type accessory tensioner of claim 4, wherein the third extension part is inserted into a shorter one of the main spring and the sub-spring.

6. The pendulum-type accessory tensioner of claim 4, wherein the second extension part is inserted into a longer one of the main spring and the sub-spring.

7. The pendulum-type accessory tensioner of claim 4, wherein a shorter one of the main spring and the sub-spring is inserted into the other one of the main spring and the sub-spring.

8. The pendulum-type accessory tensioner of claim 4, wherein the diameter of the second extension part is larger than that of a shorter one of the main spring and the sub-spring.

9. The pendulum-type accessory tensioner of claim 8, wherein one end of the shorter one of the main spring and the sub-spring is seated on the other end surface of the second extension part.

10. The pendulum-type accessory tensioner of claim 4, wherein the diameter of the first extension part is larger than that of a longer one of the main spring and the sub-spring.

11. The pendulum-type accessory tensioner of claim 10, wherein one end of the longer one of the main spring and the sub-spring is seated on the other end surface of the first extension part.

12. The pendulum-type accessory tensioner of claim 4, wherein the third extension part is a shorter length than when a shorter one of the main spring and the sub-spring is fully compressed.

13. The pendulum-type accessory tensioner of claim 12, wherein a combined length of the second and third extension parts is shorter than that when a longer one of the main spring and the sub-spring is fully compressed.

14. The pendulum-type accessory tensioner of claim 1, wherein a more rigid one of the main spring and the sub-spring does not operate in an operating range of the other one of the main spring and the sub-spring.

15. The pendulum-type accessory tensioner of claim 1, wherein the other end of the elastic unit is seated on a support part formed in a tensioning housing.

16. The pendulum-type accessory tensioner of claim 1, wherein the tensioning housing has an arc-shaped channel therein to accommodate the elastic unit and the extension part of the tensioning arm.

17. The pendulum-type accessory tensioner of claim 1, wherein the tensioning pulley applies tension to the accessory belt in a direction of rotation of a shift driving wheel in the front and rear of the shaft driving wheel, and
wherein the accessory belt is wound around the shaft driving wheel, a driving pulley disposed on a crankshaft, and a driving pulley disposed on an air conditioner compressor.

* * * * *